W. L. DINES, Jr.
HULLING MACHINE.
APPLICATION FILED JUNE 11, 1913.
1,106,085.
Patented Aug. 4, 1914.
2 SHEETS—SHEET 1.
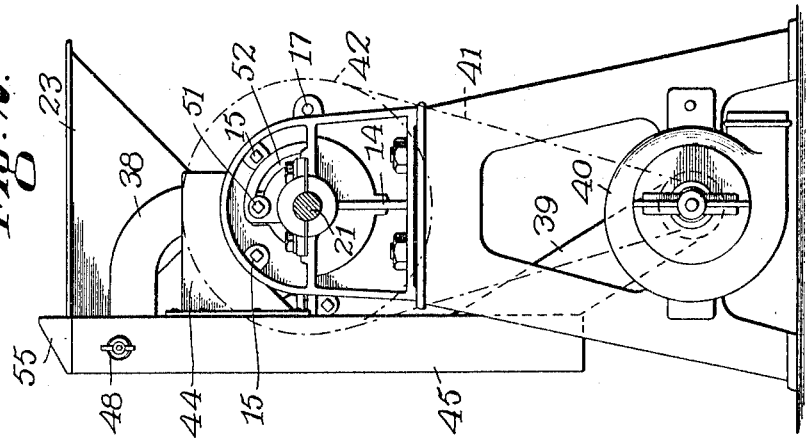
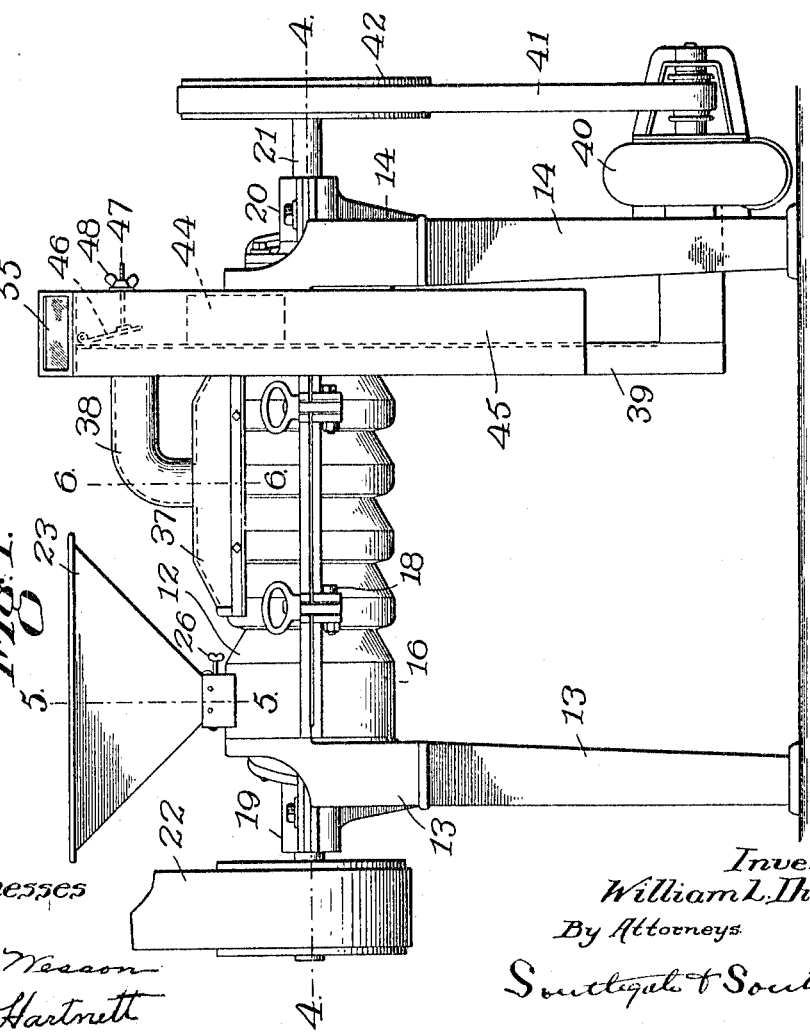
Witnesses
C. F. Wescon
C. I. Hartnett
Inventor
William L. Dines, Jr.
By Attorneys
Southgate & Southgate W. L. DINES, Jr.
HULLING MACHINE.
APPLICATION FILED JUNE 11, 1913.
1,106,085.
Patented Aug. 4, 1914.
2 SHEETS—SHEET 2.
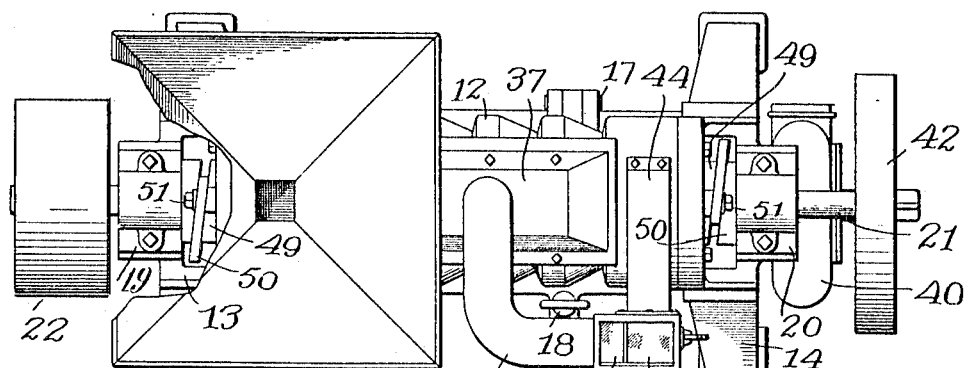
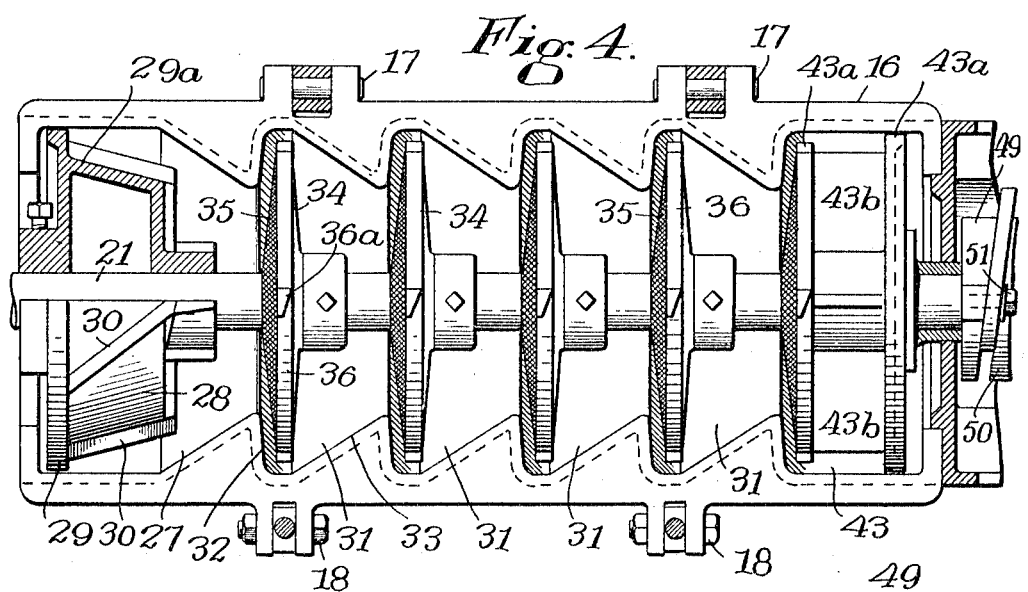
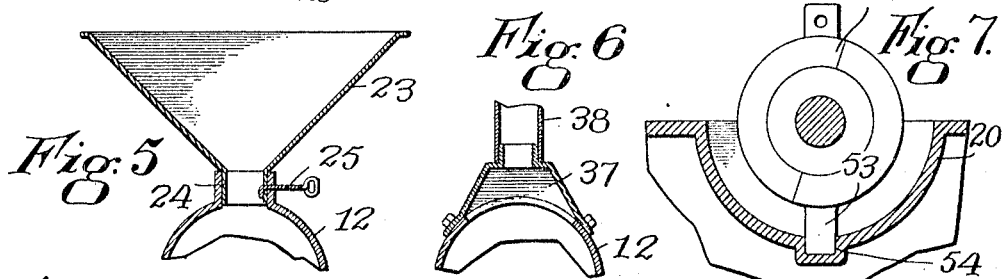
Witnesses.
C. F. Wesson
C. A. Hartnett
Inventor
William L. Dines, Jr.
By Attorneys
Southgate & Southgate

UNITED STATES PATENT OFFICE.

WILLIAM L. DINES, JR., OF WORCESTER, MASSACHUSETTS, ASSIGNOR TO WILLIAM L. DINES, JR., CO., OF WORCESTER, MASSACHUSETTS, A CORPORATION OF MASSACHUSETTS.

HULLING-MACHINE.

1,106,085.  Specification of Letters Patent.  Patented Aug. 4, 1914.

Application filed June 11, 1913. Serial No. 772,935.

*To all whom it may concern:*

Be it known that I, WILLIAM L. DINES, Jr., a citizen of the United States, residing at Worcester, in the county of Worcester and State of Massachusetts, have invented a new and useful Hulling-Machine, of which the following is a spcification.

This invention relates to hulling machines and particularly to that form of hulling machine which is used to remove the outer husks or shell from grains or berries, having special reference to the coffee berry.

The coffee berry when gathered is provided with a thin tough membrane encircling the kernel, and a thick soft outer covering or shell, which when dried becomes hard and tough. Both of these coverings must be removed before the kernel can be ground and otherwise prepared for use. The coffee berry when delivered to the hulling machine may be in either one of two forms. When it is delivered in the same condition in which it is gathered and dried it is termed "coffee dried in the cherry", and has both of the above described coverings surrounding the kernel. Under some circumstances, however, the coffee berries immediately after gathering are passed through what is termed the "pulping process" which removes the outer covering, but leaves the inner membrane intact. The coffee in this state is known to the trade as "washed coffee."

It is one of the objects of this invention to provide a hulling machine which will operate equally well upon either "washed coffee" or "coffee dried in the cherry", and which may be readily adjusted to operate upon either form.

Machines for removing these outer coverings have been previously used, but as far as I am advised, it has been necessary generally to pass the coffee repeatedly through the machine to completely remove the coverings.

It is one of the objects of this invention to provide a machine in which either or both of the coverings may be completely removed at one operation.

Further features of the invention relate to the improved hull-removing devices; to improved separating devices for conveying the detached hull from the machine; and to a simple and positive adjustment of the working elements.

Further objects of the invention will appear in the accompanying description.

A preferred form of the invention is disclosed in the accompanying drawings, in which—

Figure 1 is a side elevation of my device; Fig. 2 is an end elevation of the same; Fig. 3 is a top plan view of the machine; Fig. 4 is a horizontal sectional view taken along the line 4—4 of Fig. 1; Figs. 5 and 6 are detail sectional views taken along the lines 5—5 and 6—6 respectively of Fig. 1; and Fig. 7 is a detail of one member of the adjusting device.

The machine as herein disclosed comprises a horizontal casing 12 mounted upon supporting legs or frames 13 and 14 and secured thereto by screws 15. For convenience of operation the horizontal casing 12 is made in two parts, the upper part being secured to the supporting legs as described, and the lower portion 16 being hingedly connected at 17 to the fixed upper portion. The hinged portion 16 is also provided with clamping members 18 for securing the same in closed position. By releasing the clamping members and allowing the portion 16 to swing downwardly the operating parts of the device are readily accessible and all parts thereof may be readily cleaned.

Mounted upon the supporting legs 13 and 14 are bearings 19 and 20, within which rotates the main driving shaft 21. This shaft is driven from any convenient source of power, as by a belt 22, and is adjustable longitudinally by devices hereinafter to be described.

Referring particularly to Fig. 4, it will be seen that the shaft 21 supports a plurality of rotating operating devices within the casing. Mounted upon the casing 12 is a hopper 23 which is connected to the interior of the casing by a contracted portion 24 (see Fig. 5), and is provided at that portion with a sliding valve 25 which may be manually adjusted and thereafter retained in position by the clamping screw 26 (see Fig. 1). It is obvious that by the proper adjustment of the valve 25 the rate of feed to the operating devices may be controlled.

The material after passing through the hopper 23 is received in a feed chamber 27, as clearly shown in Fig. 4. Within this chamber or compartment is rotatably mounted a feeding member 28 comprising a disk portion 29 slightly smaller than the interior diameter of said compartment. Mounted upon said disk is a conical shell portion 29$^a$, shown partly in section in Fig. 4, and provided upon its outer surface with spirally arranged ribbed projections 30 which engage the material and force the same toward the hull-removing compartments. These compartments are shown at 31 in Fig. 4, and each consists of a substantially radial portion 32 on the side toward the feeding compartment, and a gradually contracted or conical portion 33 on the discharge side of each compartment. As ordinarily used, a plurality of these compartments is provided, and the number thereof may be varied, as desired. Within each compartment is rotatably mounted upon the shaft 21 a hull-removing member 34. Each of these members consists of a disk having a slightly conical, but substantially radial rubbing surface 35, and a narrow edge portion 36. Upon this edge portion there is also provided a plurality of wedge-shaped projections or clearers 36$^a$. The coöperating surfaces 32 and 35 between which a rubbing action upon the material is effected, are each provided with corrugations upon their coöperating surfaces. These corrugations may consist of substantially radial grooves or of a plurality of raised points, and the term as used in the claims is intended to cover either form of the roughened surface. The corrugations of the surface 32 may be provided entirely around the casing or may be confined to the lower portion only.

Referring now to Figs. 1 and 6, it will be seen that the casing 12 has mounted thereon a draft-chamber 37 which over-lies all of the hull-removing compartments, and is connected through a pipe 38 with a downwardly extending pipe or tube 39 which communicates with an exhaust device 40 which may be of any common form. As shown herein, the device 40 consists of a rotary fan mounted upon the supporting leg 14 and driven by a belt 41 from a pulley 42 mounted upon the end of the main driving shaft 21.

Referring again to Fig. 4, it will be seen that the casing 12 is provided with an expelling chamber 43 at the extreme right-hand portion thereof. Within this chamber is mounted an expelling device consisting, in the preferred form, of a pair of side members or disks 43$^a$ and a plurality of fan-like blades 43$^b$ supported between the disks. The exterior side of the left-hand side member 43 may be provided with corrugations, and may perform the functions of a hull-removing member if desired.

The operation of the device as thus far described is as follows:—The coffee berries or other material having been deposited in the hopper 23, the valve 25 is adjusted to secure the desired rate of feed, and the berries pass to the feeding compartment from which they are forced by the rotating feeding member into the first of the hull-removing compartments. In order to enter this compartment they pass between the corrugated surfaces 32 and 35, and the coöperation of these surfaces acts to loosen and remove the coverings from the kernel. The wedge-shaped projections upon the edge 36 of the hull-removing member act to clear the lower portions of the hull-removing compartment, and to force the berries forward toward the second and subsequent compartments. While passing through these compartments, the loosened hulls are drawn upward into the draft-chamber 37 and through the pipes 38 and 39 to the exhaust device, from which they may be conveyed to suitable receptacles. The kernels or grains on account of their greater weight are not affected by the suction through the draft-chamber and pass successivly from one hull-removing compartment to the next until they reach the expelling compartment 43 where they are taken up by the fan-like blades and are thrown upwardly into a pipe 44 (see Fig. 2), from which they pass into a downwardly projecting tube 45, which may discharge into any suitable receptacle. The two pipes 39 and 45 are herein shown as being adjacently mounted, and certain important results are obtained from this arrangement. As shown in dotted lines in Fig. 1, a hinged valve 46 is provided mounted upon the partition separating the two pipes, said valve being provided with a screw-threaded extension 47 extending through the pipe 45 and adjustable by a wing-nut 48. By opening the valve 46 it is evident that any desired amount of upward draft may be created in the pipe 45 and that any hulls or dirt passing into the expelling chamber 43 will be separated from the kernels as they pass from the pipe 44 into the downwardly extending pipe 45.

As previously stated, this machine is designed to operate upon material in different stages of preparation, and for this reason and also because of the different sizes and grades of coffee berries which reach the markets, it is necessary that means be provided for adjusting the distance between the rubbing surfaces 32 and 35. A preferred form of such adjusting means will now be described.

Referring to Fig. 3, the shaft 21 has mounted upon it at either end and adjacent the bearings 19 and 20, two pairs of adjusting collars 49 and 50. These collars are provided with coöperating cam or wedge surfaces, as shown more clearly in Fig. 4, the collar 49 being also provided with a screw 51 passing through a segmental slot 52 in a flange on the collar 50. By loosening the screw 51 and changing the angular adjustment of the collars 49 and 50 relative to each other, it is evident that the combined length of the pair of collars may be increased or decreased as desired. The collar 49 is provided with an extension 53 which projects into a recess 54 in the supporting frame or bearing (see Fig. 7), the collar 49 being thereby restrained from rotation.

To change the adjustment of the rubbing surfaces 32 and 35 it is merely necessary to loosen the screws 51 in each of the pairs of adjusting collars, and to increase the effective length of one pair, while correspondingly decreasing the effective length of the other. In this manner any desired change in the distance between the rubbing surfaces may be readily effected. The pipes 39 and 45 may be surmounted by a glass cover 55 through which the operation of the device may be observed.

While the preferred form of the invention is disclosed herein it is evident than many modifications therein can be made by one skilled in the art without departing from the scope of the invention as defined by the claims.

What is claimed is:—

1. In a hull-removing machine, a hull-removing disk having one smooth surface, a corrugated rubbing surface, and a narrow edge portion provided with a plurality of wedge-shaped clearing projections arranged to move the grain axially of said disk toward its smooth surface.

2. A hulling machine having in combination a longitudinally extended casing, a rotary shaft mounted therein, hull-removing means thereon, and a conical ribbed feeding member also mounted upon said shaft to feed the grain axially toward the apex of the cone.

3. A hulling machine having in combination a longitudinally extended casing, a rotating shaft mounted therein, hull-removing means thereon, and feeding means on said shaft comprising a conical shell and spirally arranged feeding ribs thereon to feed the grain axially toward the apex of the cone.

4. A hulling machine having in combination a casing, hull-removing means, and rotatable feeding means comprising a disk only slightly less in diameter than the inclosing casing, a conical shell secured to said disk, and spirally arranged ribs on said conical shell to feed the grain axially toward the apex of the cone.

5. In a hulling machine, a rotating shaft, a bearing for said shaft having a recess therein, and longitudinal adjusting means for said shaft comprising a pair of wedge-shaped collars loosely mounted on said shaft adjacent to said bearing, means including a segmental slot in one collar and a binding screw supported upon the other collar and extending through the slot to hold said collars in adjusted angular relation to each other, and a projection on one of said collars extending into the recess in the bearing and preventing rotation of the collars relative to said bearing but permitting longitudinal adjusting movement relative thereto.

6. In a hulling machine, a casing having a plurality of hull-removing compartments therein, a plurality of hull-removing members operable in said compartments, a single draft chamber overlying all of said compartments, suction means, a draft pipe affording a connection from said suction means to said draft chamber, a second pipe for conveying grain from the casing and having a lateral opening into said draft pipe, and a valve for said opening operable to vary the suction in said second pipe but leaving the draft pipe at all times unobstructed and directly connected to said suction means.

In testimony whereof I have hereunto set my hand, in the presence of two subscribing witnesses.

WILLIAM L. DINES, Jr.

Witnesses:
CHAS. T. HAWLEY,
C. FORREST WESSON.

Copies of this patent may be obtained for five cents each, by addressing the "Commissioner of Patents, Washington, D. C."